No. 12,306. REISSUED JAN. 17, 1905.

E. D. SCHMITT.

BOTTLE SEAL.

APPLICATION FILED OCT. 8, 1904.

Inventor

Edward D. Schmitt

By Titus W. Johnson

Attorney

Witnesses

J. L. Mackey

F. J. F. Johnson

No. 12,306. Reissued January 17, 1905.

UNITED STATES PATENT OFFICE.

EDWARD D. SCHMITT, OF NEW YORK, N. Y., ASSIGNOR, BY MESNE ASSIGNMENTS, TO CHAMPION SEAL COMPANY, OF NEW YORK, N. Y., A CORPORATION OF NEW YORK.

BOTTLE-SEAL.

SPECIFICATION forming part of Reissued Letters Patent No. 12,306, dated January 17, 1905.

Original No. 756,715, dated April 5, 1904. Application for reissue filed October 8, 1904. Serial No. 227,757.

*To all whom it may concern:*

Be it known that I, EDWARD D. SCHMITT, a citizen of the United States, residing in the city of New York, in the county and State of New York, have invented certain new and useful Improvements in Bottle-Seals, of which the following is a specification.

This invention relates to new and useful improvements in bottle-seals especially adapted to sealing bottles containing liquids under pressure. In this art after the provision of a perfectly air-tight seal it is of paramount importance that the construction of the seal be such that it can be cheaply manufactured, this in view of the fact that the seals are thrown away after being removed from the bottle or seldom, if ever, reused, thus entailing more or less loss, according to the cost of manufacture.

My object, therefore, is to provide a perfect seal that will stand the internal bottle-pressure under all conditions and one that will meet the requirements of cheapness, as well as the minor requirements of being readily applied and removed and sightly in appearance.

The further object is to provide a seal that can be readily applied without the aid of complicated machinery and which will require but a single operation for its application, the seal after being inserted in the bottle-neck requiring no further operation or treatment, such as flexing, crimping, spinning, or expanding.

A still further object is to provide a closure embodying such construction as to permit the ready engagement with an unsealing-tool and one that will prevent the liquid from coming in contact with the metallic portion of the seal and which will afford no opportunity for the accumulation of dust, dirt, or other foreign matter.

Figure 1:
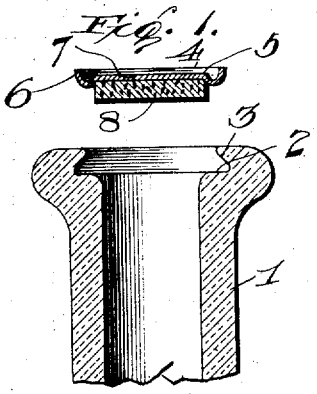
Figure 2:
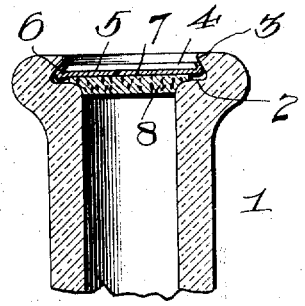
Figure 3:
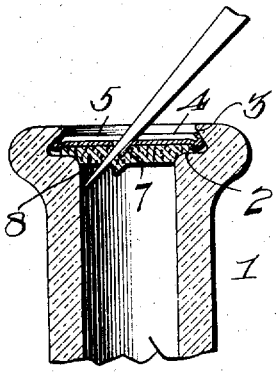
Figure 7:
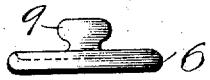
Figure 4:
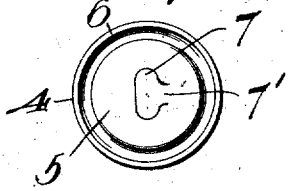
Figure 5:
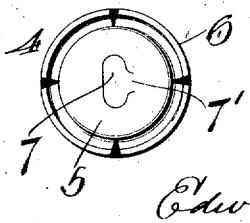
Figure 6:
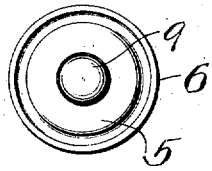

Figure 1 is a central vertical section of the upper portion of a bottle-neck with which the seal is adapted for use, with the seal above the same also in section. Fig. 2 is a section of the bottle neck and seal, showing the latter applied. Fig. 3 is a sectional view of the bottle neck and seal, showing the manner of inserting an implement for removing the seal. Fig. 4 is a top plan view of the seal, more clearly showing the yielding portion which is engaged by the tool or implement in the unsealing operation. Fig. 5 is a top plan view of the securing member, showing the rim slitted. Fig. 6 is a top plan view of the securing member, showing a modified form of means for affording engagement with a tool for unsealing purposes; and Fig. 7 is a side elevation of the modified form of seal shown in Fig. 6.

Referring to the drawings, the numeral 1 designates the neck of a bottle, which I provide with a sealing-seat 2 and a slightly inwardly inclined wall or shoulder 3 above said seat, thereby producing at the rim or edge of the bottle a mouth of less diameter than the space between the walls below said mouth, all for a purpose that will presently become apparent.

The numeral 4 indicates the securing member, formed, preferably, of sheet-tin, with a slightly-raised central portion 5 and a circumferential elastic rim or flange 6, adapted to impinge against the wall in the bottle-neck when the seal is applied, as shown in Figs. 2 and 3. In order to permit the convenient insertion of a pointed tool for removing the seal, I cut or punch the central portion 7, preferably held to the securing member by a narrow integral portion 7′, or said yielding portion need not be cut entirely through the securing member, but sufficiently so to weaken it considerably, so that it will readily yield upon being engaged by the seal-removing tool. The form of the central yielding portion shown is the one I prefer, although it is obvious that the metal of the securing member could be cut or weakened at any desired point in any desired shape and it would serve its purpose equally as well, or a narrow slit may be left in the securing member for the passage of a tool, if found desirable.

In the slightly-raised central portion 5 of the securing member I cement or otherwise secure the sealing member 8, which is preferably of cork, which is the material best adapted for sealing purposes, yet any sufficiently-compressible material would answer the purpose. I find in practice that by slightly raising the securing member to form the portion 5 the sealing member or disk is more readily centered than if the bottom of the securing member were perfectly flat; but even this is not absolutely essential, for with accurate machinery for attaching the securing member to the sealing member the latter could be readily centered.

In the modification Fig. 5 the securing member is identical with that shown in the main figures, except the rim is slitted at intervals, which renders the same a little more resilient, which characteristic may under some conditions be desirable.

In the modification shown in Fig. 6 I provide the securing member with a central knob 9, that may be readily engaged by a forked tool for the purpose of removing the seal.

To apply the seal, it is only necessary to force the same into the bottle-mouth by any suitable tool or mechanism until the upturned rim or flange is compressed sufficiently to permit its passage through the contracted portion of the mouth, when with the continuation of a downward pressure on the seal the sealing member will be brought in contact with the sealing-seat and the rim or flange will expand into locking engagement with the inclined wall 3, thus locking the seal firmly in place. To remove the seal, as before indicated or suggested, it is only necessary to engage the yielding portion 7 with a suitable tool, which with the use of sufficient force will yield to permit the passage of the tool with which the seal can be easily pried out.

It will be seen from the foregoing description that the seal requires no further treatment after being forced into the neck of the bottle, the resilient flange thereof expanding into locking engagement with the overhanging locking-surface above the locking-seat, and that the described seal presents locking possibilities which are peculiar to it, in combination with the locking-shoulder in the bottle, in that a perfect seal is insured even though the compressibility of the sealing-disk or the pressure of the sealing-tool may vary—that is to say, a lock will be formed between said shoulder or locking-surface and the flange or rim of the securing member at any point in the length of said shoulder or locking-surface. A characteristic of the bottle employed is that the sealing-seat extends inwardly beyond the wall of the mouth, and the wall between the mouth and seat is at all points outside the wall of the mouth.

I claim—

1. A bottle-seal comprising a securing member formed with a circumferential rim or flange upturned and substantially semicircular in cross-section, and means for affording engagement with a suitable tool for removing the seal.

2. A bottle-seal comprising a metallic securing member having an integral circumferential rim or flange, said rim or flange being upturned and substantially semicircular in cross-section, a sealing member carried by the securing member, and means for affording engagement with a suitable tool for removing the seal.

3. A bottle-seal comprising a securing member having an upturned circumferential rim or flange and a yielding portion adapted to be engaged by a suitable tool for unsealing purposes, and a sealing member carried by the securing member.

4. In a bottle-seal, the combination with a bottle having a sealing-seat in the neck thereof and a wall inclining upwardly and inwardly from said seat, a securing member provided with an upturned resilient rim or flange in engagement with said wall, and a sealing member held in engagement with the sealing-seat by the securing member, substantially as described.

5. In a bottle-seal, the combination with a bottle having a sealing-seat in the neck thereof, and a wall above said seat inclining slightly inwardly and upwardly, a metallic securing member formed with an integral circumferential upturned resilient rim or flange adapted to impinge against said wall in the bottle-neck, a sealing member held in contact with the sealing-seat by the securing member, and means for affording engagement with a suitable tool for removing the seal, substantially as described.

6. In a bottle-seal, the combination with a bottle having a sealing-seat in the neck thereof, and a wall above said seat inclining slightly inwardly and upwardly, a metallic securing member formed with an integral circumferential elastic rim or flange adapted to impinge against said wall, a sealing member held in contact with the sealing-seat by the securing member, substantially as described.

7. In a bottle-seal, the combination with a bottle having a sealing-seat in the neck thereof, and a wall above said seat inclining slightly inwardly and upwardly, a metallic securing member formed with an integral circumferential elastic rim or flange adapted to impinge against said wall, a sealing member held in contact with the sealing-seat by the securing member, and means for affording engagement with a suitable tool for removing the seal.

8. In a bottle-seal, the combination with a bottle having a sealing-seat in the neck thereof, and a wall above said seat inclining slightly inwardly and upwardly, a metallic securing member formed with an integral circumferential rim or flange adapted to impinge against the wall in the bottle-neck and a yielding portion adapted to be engaged by a suitable tool for unsealing purposes, substantially as described.

9. In a bottle-seal, the combination with a bottle having a sealing-seat in the neck thereof and a wall thereabove and overhanging said seat and terminating therein, a securing member provided with an upturned resilient rim or flange engaging said wall, and a sealing member held in engagement with the sealing-seat by the securing member, substantially as described.

10. In a bottle-seal, the combination with a bottle having a sealing-seat in the neck thereof extending inwardly beyond the mouth of the bottle, and a locking-surface above the seat and extending downwardly and outwardly from the mouth, the walls at all points between the mouth and seat being outside of the wall of the mouth, of a sealing device comprising a sealing-washer seating upon the seat, and a circular metallic securing member formed from a circular disk of metal, the edge of which is turned up to form a short resilient flange of a diameter in excess of the mouth of the bottle and adapted when forced therethrough to expand by reason of its resilience into frictional engagement with said locking-surface, the point of engagement between the locking-surface and the edge of the flange being determined by the depth of insertion.

11. In a bottle-seal, the combination with a bottle having a sealing-seat in the neck thereof extending inwardly beyond the mouth of the bottle, and a locking-surface above said seat and extending downwardly and outwardly from the mouth, of a sealing device comprising a sealing-washer seating upon the seat and a circular metallic securing member formed from a circular disk of metal the edge of which is turned up to form a short resilient flange of a diameter in excess of the mouth of the bottle and adapted when forced therethrough to expand by reason of its resilience against the locking-surface and thereby form continuous or substantially continuous frictional locking engagement with said locking-surface.

EDWARD D. SCHMITT.

Witnesses:
KATHARINE MACMAHON,
LILLIE F. BROWNING.